United States Patent Office 3,236,898
Patented Feb. 22, 1966

3,236,898
3-METHYL-2,5-DIMETHOXYBENZALDEHYDE
Milton Green, Newton Highlands, Mass., and Adnan A. Sayigh and Henri Ulrich, New Haven, Conn., assignors to Polaroid Corporation, Cambridge, Mass., a corporation of Delaware
No Drawing. Filed Apr. 29, 1960, Ser. No. 25,559
1 Claim. (Cl. 260—600)

This invention relates to a novel compound useful in the preparation of other compounds having utility in the photographic art and more particularly to 3-methyl-2,5-dimethoxybenzaldehyde and the method of preparing it.

The novel compound of this invention is useful as a starting material in the preparation of certain derivatives of hydroquinone which have utility as developing agents in the photographic field, in accordance with the general procedure set forth in copending U.S. application Serial No. 612,051, filed September 25, 1956, and now Patent No. 3,019,107. For example, the 3-methyl-2,5-dimethoxybenzaldehyde may be condensed with p-nitrophenyl acetic acid by heating to obtain 3-methyl-2,5-dimethoxy-4'-nitrostilbene. The latter may then be hydrogenated in the manner set forth in the above-mentioned copending application to obtain p-(3-methyl-2,5-dimethoxyphenethyl)-aniline. Demethylation of this compound by refluxing under nitrogen in HBr will then yield 2-(p-aminophenethyl)-6-methyl-hydroquinone. The latter compound is found to be useful as a photographic developing agent. It may be used in the manner set forth in the aforementioned copending application.

It has heretofore not been possible to prepare the novel compound of this invention. A number of successful direct synthetic approaches to the preparation of isomers of 3-methyl-2,5-dimethoxybenzaldehyde have failed to produce the desired compound.

It is therefore an object of this invention to prepare the heretofore unknown 3-methyl-2,5-dimethoxybenzaldehyde.

Another object is to obtain a novel compound having utility as an intermediate for preparing various compounds useful as developers in the photographic art.

Other objects of the invention will in part be obvious and will in part appear hereinafter.

The invention accordingly comprises the processes involving the several steps and relation and order of one or more of such steps with respect to each of the others, and the product possessing the features, properties and the relation of elements which are exemplified in the following detailed disclosure, and the scope of the application of which will be indicated in the claim.

For a fuller understanding of the nature and objects of the invention, reference should be had to the following detailed description.

It has now been found that the novel 3-methyl-2,5-dimethoxybenzaldehyde can be prepared by the following three step procedure:

(I) 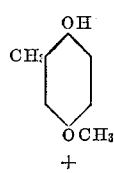
+ hydroxymethylation in accordance with the Lederer-Manasse reaction (II) ↓

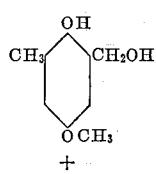
+ etherification (III) ↓

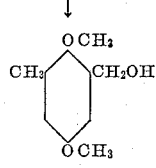
+ oxidation with SeO₂ by the Weygand method (VI) ↓

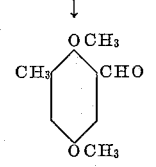

In the above process, 2-methyl-4-methoxyphenol (I) is converted via the Lederer-Manasse reaction with formaldehyde and calcium oxide in an aqueous medium to obtain 2-methyl-4-methoxy-6-hydroxymethylphenol (II). The latter was obtained in 82% yield (crude) and was found to melt at 58–59° C. on crystallization from isohexanes.

The crude 2-methyl-4-methoxy-6-hydroxymethylphenol as isolated from the reaction mixture is then etherified, without purification, with methyl iodide to yield 3-methyl-2,5-dimethoxybenzylalcohol (III). The latter was obtained in an overall yield of 54% based on the starting material. Other suitable methylating agents, such as dimethyl sulfate, may also be employed.

Finally, the etherified benzylalcohol derivative (III) is oxidized by the Weygand method with selenium dioxide (note, for example, Weygand et al., Ber. 83, 394 [1950]) to produce the desired 3-methyl-2,5-dimethoxybenzaldehyde (IV) in 75% yield, or an overall yield for the three steps of 38%. It was found to have a melting point of 42° C.

This compound can also be synthesized by a second method, involving an essentially similar reaction sequence. This second method, which does not produce as satisfactory a yield, involves the following sequences of steps:

(I)

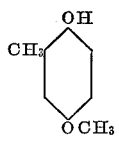

+

HCHO and (CH₃)₂NH (V)

↓

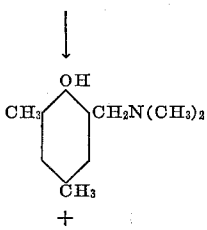

+

(CH₃CO)₂O (VI)

↓

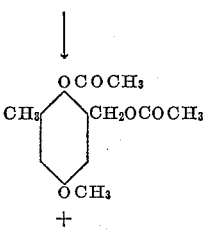

+ hydrolysis (II)

↓

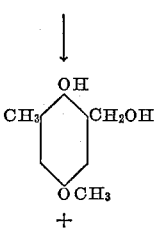

+ etherification with (CH₃)₂SO₄

(III)

↓

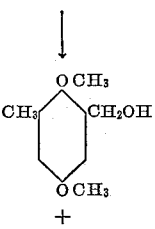

+ oxidation with SeO₂

(IV)

↓

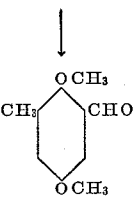

As will be apparent from the above diagrammatic sketch of the second process of synthesis, the same starting material, 2-methyl-4-methoxyphenol (I) was subjected to a Mannich reaction with formaldehyde and dimethylamine to yield 2-methyl-4-methoxy-6-dimethylamino-methylphenol (V). The Mannich reaction per se is well known to those skilled in the art. Attention is invited, for example, to JACS, 71, 4014 (1949), and JACS, 74, 127 (1952).

The reaction product (V) is then heated with acetic anhydride to obtain 2-acetoxy-3-methyl-5-methoxybenzylacetate (VI).

The latter was then hydrolyzed in suitable alkali, such as sodium hydroxide, to obtain 2-methyl-4-methoxy-6-hydroxymethylphenol (II).

The 3-methyl-2,5-dimethoxybenzaldehyde was then produced substantially in accordance with the procedure outlined in the first process. The 2-methyl-4-methoxy-6-hydroxymethylphenol obtained by hydrolysis was not isolated, but was etherified with dimethylsulfate to yield 3-methyl-2,5-dimethoxybenzylalcohol (III).

Finally, the desired aldehyde (IV) is obtained by oxidation with selenium dioxide in the manner heretofore explained. This product was found to be identical in all respects to the aldehyde (IV) obtained by following the sequence of steps of the first process. As was indicated above, however, the overall yield of the second process is not as great as the yield obtained by the first process of synthesis.

The examples which follow are submitted to illustrate and not to limit this invention.

*Example 1*

To 138 g. of 2-methyl-4-methoxyphenol in 800 ml. of water 81 g. of 37% formalin was added. To this suspension with cooling under a blanket of nitrogen, 28 g. of CaO was added gradually. The operation was performed in a jar and after the lid was closed tightly all the material went into solution upon shaking. After standing overnight in an ice box, wart-like crystals had separated on the walls of the reaction vessel. Upon shaking, the whole contents of the jar became solid due to formation of the calcium salt of the reaction product. The reaction mixture was diluted with water, acidified with acetic acid and the precipitated oily phenol extracted with ether. The ether extract was washed with NaHCO₃ to remove excess acetic acid, washed with water, and dried over Na₂SO₄. Evaporation afforded 137.5 g. of crude 2-methyl-4-methoxy-6 - hydroxymethylphenol. Distillation of the crude product under vacuum resulted in extensive decomposition. The distillate, B.P. 136–140° C. at 1 mm., solidified M.P. 56–57° C.: on crystallization from iso-hexanes, it melted at 58–59° C. and was found to be 2-methyl-4-methoxy-6-hydroxymethylphenol.

*Example 2*

137.5 g. of the crude 2-methyl-4-methoxy-6-hydroxymethylphenol prepared in Example 1 was dissolved in 200 ml. of acetone. After addition of 115 g. of anhydrous K₂CO₃ and 125 g. of methyl iodide, the solution came to reflux due to an exothermic reaction. After the initial reaction ceased, the mixture was refluxed with stirring for 18 hours. It was poured into a large volume of water and the precipitated oil extracted with ether. The ether extract was washed with 2 N NaOH to remove unreacted phenols and after repeated washing with water, dried over Na₂SO₄. Rectification in vacuo afforded:

(1) 5.8 g., B.P./0.6 mm., 65–85° C.; $n_D^{24}$ 1.5215.
(2) 14.2 g., B.P./0.6 mm., 85–109° C.; $n_D^{24}$ 1.5232.
(3) 78.5 g., B.P./0.6 mm., 109–114° C.; $n_D^{24}$ 1.5327.
(4) 19.7 g., B.P./0.6 mm, 114–116° C.; $n_D^{24}$ 1.5344.

The first two fractions are mainly toluhydroquinone dimethylether. Fractions 3 and 4 consist mainly of 3-methyl-2,5-dimethoxybenzylalcohol. The yield was 98.2 g. From the NaOH extract, 7.1 g. of phenolic material was recovered. A sample of fraction 3 was submitted for analysis. *Analysis.*—Calc. for $C_{10}H_{14}O_3$: C, 65.91; H, 7.74. Found: C, 64.24; H, 7.94.

*Example 3*

To 95.8 g. of the 3-methyl-2,5-dimethoxybenzylalcohol in 100 ml. of benzene 30 g. of finely powdered SeO₂ was added and the suspension azeotropically distilled until the formation of water ceased (3.5 g. of water was collected, the theoretical amount being 4.5 g.). The benzene was evaporated in vacuo and the residue was slowly distilled using an oil bath. After a fore-run of 6.2 g. of a red oil, 71.5 g. (75%) of 3-methyl-2,5-dimethoxybenzaldehyde, M.P. 40–41° C., was collected. After recrystallization from ligroin, white needles, M.P. 42° C., were obtained. *Analysis.*—Calc. for $C_{10}H_{12}O_3$: C, 66.65; H, 6.71. Found: C, 66.69; H, 6.66. The 2,4-dinitrophenylhydrazone, orange needles after recrystallization from alcohol/ether acetate, melted at 225–226° C. The semicarbazone, white silky needles from xylene/ethyl acetate, melted at 198–200° C.

*Example 4*

To a mixture of 20 g. of 2-methyl-4-methoxyphenol and 29 g. of 25% dimethylamine, 13 g. of formalin (37%) was added dropwise with stirring and the temperature was kept below 20° C. After stirring for two hours, the reaction mixture was extracted with benzene, dried over $Na_2SO_4$, and the benzene was evaporated. The resulting crude 2-methyl-4-methoxy-6-dimethylaminomethyl phenol was refluxed for 3 hours with 50 g. of acetic anhydride. After dilution with water, it was extracted with benzene, washed with water, sodium carbonate and finally with water and the solvent evaporated. The residue is 2-acetoxy-3-methyl-5-methoxybenzyl acetate. The diacetate was heated in NaOH with dimethyl sulfate for 90 minutes, acidified with HCl, extracted with ether and the ether evaporated. The residue was distilled in vacuo and 3.1 g. of a fraction was obtained, B.P.=113–118° C. at 1 mm., $n_D^{22.5}$ 1.5350 which was identical with the methyl-2,5-dimethoxybenzylalcohol obtained in Example 2.

Oxidation with selenium dioxide in the manner set forth in Example 3 yielded the desired 3-methyl-2,5-dimethoxybenzaldehyde.

Since certain changes may be made in the above processes and products without departing from the scope of the invention herein involved, it is intended that all matter contained in the above description shall be interpreted as illustrative and not in a limiting sense.

What is claimed is:

3-methyl-2,5-dimethoxybenzaldehyde.

References Cited by the Examiner

UNITED STATES PATENTS

| | | | |
|---|---|---|---|
| 526,786 | 10/1894 | Manass | 260—621 |
| 2,496,803 | 2/1950 | McMillan | 260—600 |
| 2,516,412 | 7/1950 | Pearl | 260—600 |
| 2,579,331 | 12/1951 | Martin | 260—613 X |
| 2,839,587 | 6/1958 | Raum | 260—621 |

FOREIGN PATENTS 515,819   8/1955   Canada.

OTHER REFERENCES

Perkin: Jour. Chem. Soc., London, vol. 109 (1916), page 915.

Weygand et al.: Ber. Deut. Chem., vol. 83 (1950), pages 394–399.

LEON ZITVER, *Primary Examiner.*

CHARLES B. PARKER, *Examiner.*